United States Patent
Upadhye

(10) Patent No.: US 7,431,084 B1
(45) Date of Patent: Oct. 7, 2008

(54) PRODUCTION OF HYDROGEN FROM UNDERGROUND COAL GASIFICATION

(75) Inventor: Ravindra S. Upadhye, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 133 days.

(21) Appl. No.: 11/519,688

(22) Filed: Sep. 11, 2006

(51) Int. Cl.
*E21B 43/00* (2006.01)

(52) U.S. Cl. .................. 166/265; 166/228; 166/369

(58) Field of Classification Search .............. None
See application file for complete search history.

(56) References Cited

U.S. PATENT DOCUMENTS

| | | | |
|---|---|---|---|
| 4,356,866 A | | 11/1982 | Savins |
| 4,386,657 A | * | 6/1983 | Kiss et al. .................. 166/261 |
| 5,332,036 A | | 7/1994 | Shirley et al. |
| 5,860,476 A | * | 1/1999 | Kjos .......................... 166/265 |
| 6,725,921 B2 | | 4/2004 | de Rouffignac et al. |
| 2003/0024699 A1 | | 2/2003 | Vinegar et al. |

* cited by examiner

*Primary Examiner*—Jennifer H. Gay
*Assistant Examiner*—Angela DiTrani
(74) *Attorney, Agent, or Firm*—Eddie E. Scott; John H. Lee

(57) ABSTRACT

A system of obtaining hydrogen from a coal seam by providing a production well that extends into the coal seam; positioning a conduit in the production well leaving an annulus between the conduit and the coal gasification production well, the conduit having a wall; closing the annulus at the lower end to seal it from the coal gasification cavity and the syngas; providing at least a portion of the wall with a bifunctional membrane that serves the dual purpose of providing a catalyzing reaction and selectively allowing hydrogen to pass through the wall and into the annulus; and producing the hydrogen through the annulus.

17 Claims, 4 Drawing Sheets

PRODUCTION OF HYDROGEN FROM UNDERGROUND COAL GASIFICATION

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to coal gasification and more particularly to producing hydrogen from underground coal gasification.

2. State of Technology

U.S. Pat. No. 4,356,866 issued Nov. 2, 1982 to Joseph G. Savins and assigned to Mobil Oil Corporation provides the following state of technology information, "Useful product is recovered from an underground coal seam by drilling a passage extending from the surface to a cavity formed in the floor rock below the coal seam, drilling one or more upwardly radially extending channels from the cavity forming an injection manifold-like system which extends to the interface between the floor rock and the coal seam, injecting an oxidant or oxidant gas mixture into these channels from the surface, igniting the coal where the radially extending channels connect with the base of the coal seam and recovering product gases generated by the gasification process through a plurality of surrounding production wells."

U.S. Pat. No. 5,332,036 issued Jul. 26, 1994 to Arthur I. Shirley and assigned to The BOC Group, Inc. provides the following state of technology information, "Underground coal formations and other such carbon deposits contain natural gas components, such as the lower molecular weight hydrocarbons, due to effects of long term coalification. Coal generally has a low porosity, hence most of the coalbed gas is in the form of sorbate on the surfaces of the coal rather than being entrapped within the coal. The gas is present in the coal deposit in significant quantities; accordingly it is economically desirable to extract them for use as fuel and for other industrial purposes."

U.S. Pat. No. 6,725,921 issued Apr. 27, 2004 to Eric Pierre de Rouffignac and assigned to Shell Oil Company provides the following state of technology information, "Hydrocarbons obtained from subterranean (e.g., sedimentary) formations are often used as energy resources, as feedstocks, and as consumer products. Concerns over depletion of available hydrocarbon resources have led to development of processes for more efficient recovery, processing and/or use of available hydrocarbon resources, for example coal. In situ processes for coal formations may be used to remove hydrocarbon materials from subterranean formations. Chemical and/or physical properties of coal within a subterranean formation may need to be changed to allow coal to be more easily removed from the subterranean formation. The chemical and physical changes may include in situ reactions that produce removable fluids, composition changes, solubility changes, phase changes, and/or viscosity changes of the hydrocarbon material within the formation. A fluid may be, but is not limited to, a gas, a liquid, an emulsion, a slurry and/or a stream of solid particles that has flow characteristics similar to liquid flow."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The future of the coming hydrogen ($H_2$) economy depends on inexpensive and environmentally sound production of $H_2$ in large quantities. Underground Coal Gasification (UCG) is a potential technology for producing $H_2$. Typical product gas from UCG contains, in addition to $H_2$, steam ($H_2O$), carbon monoxide (CO) and carbon dioxide ($CO_2$). The water-gas shift (WGS) reaction can be used to convert the CO to H2 as follows:

$$CO+H_2O \rightarrow CO_2+H_2 \qquad \text{[Equation 1]}$$

using the steam already present in the product gas. This reaction is generally conducted above ground, necessitating additional equipment (such as a chemical reactor and heat exchangers).

The present invention provides an apparatus and method of obtaining hydrogen from a coal seam, without the necessity of using surface reactors. In one embodiment, the method comprises providing a production well that extends into the coal seam; positioning a conduit in the production well leaving an annulus between the conduit and the coal gasification production well, the conduit having a wall; providing at least a portion of the wall with a bifunctional membrane that serves the dual purpose of providing a catalyst for the water-gas shift reaction and selectively allowing hydrogen to pass through the wall and into the annulus; and producing the hydrogen through the annulus. In one embodiment, the present invention provides an apparatus for producing hydrogen from a coal gasification production well comprising a conduit adapted to be positioned in the coal gasification production well, an annulus between the conduit and the coal gasification production well, at least a portion of the conduit being a bifunctional membrane that serves the dual purpose of providing a catalyzing reaction and selectively allowing hydrogen to pass into the annulus for production.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
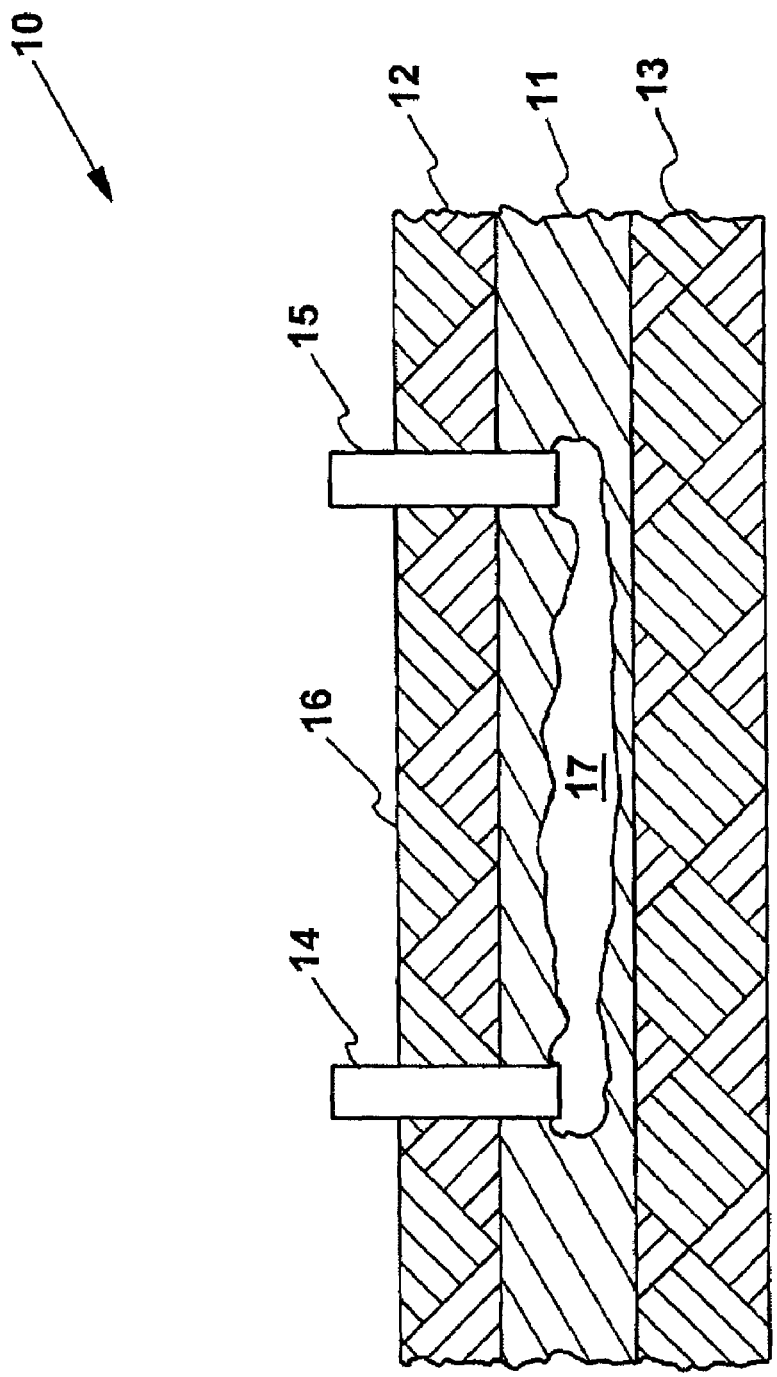
FIG. 1 illustrates an underground coal gasification system.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawing an in particular to FIG. 1, a system of underground coal gasification is illustrated. The underground coal gasification system is designated generally by the reference numeral 10. The *Wikipedia Encyclopedia* defines underground coal gasification as follows: "Underground Coal Gasification (UCG) is a technique for extracting coal gas from underground coal seams that are too deep or too expensive to mine. Oxidants are injected into the coal seam, and as the coal burns (or gasifies), the gas produced is extracted through boreholes. The product can then be used for power generation, industrial heating, or as a chemical feedstock."

The underground coal gasification system 10 provides product from a coal seam 11. The coal seam 11 is between an upper rock formation 12 and a lower rock formation 13. The underground coal gasification system 10 utilizes an injection well 14 and a production well 15 drilled from the surface 16 to the coal seam 11.

Steam and oxygen are injected into the injection well 14, connected to the production well 15. The steam and oxygen travels through a portion 17 of the coal seam 11. The steam reacts with coal 11 according to the endothermic reaction Equation 2:

$$C+H_2O \rightarrow CO+H_2 \quad \text{[Equation 2]}$$

The oxygen (either pure or from air) provides the endothermic heat of reaction, Equation 2, through the highly exothermic reaction, Equation 3:

$$C+O_2 \rightarrow CO_2 \quad \text{[Equation 3]}$$

In addition, a mildly exothermic reaction, commonly known as the water gas shift reaction, also takes place:

$$CO+H_2O \rightarrow H_2+CO_2 \quad \text{[Equation 4]}$$

In conventional UCG, the product gas out of the production well, containing a mixture of $H_2$, CO, $CO_2$, steam and $N_2$ (if air is used as a source of $O_2$ in reaction 2), is cleaned, desulfurized, and sent to a shift reactor where reaction, Equation 4, takes place, yielding hydrogen $H_2$. The yield in such reactors is always limited by equilibrium. Since reaction, Equation 4, is exothermic, low temperature is desirable for shifting the reaction to the right; however, high temperature is desirable for obtaining high reaction rates. This necessitates a compromise, and resultant lower yield of $H_2$.

Conventional Underground Coal Gasification (UCG) is used for coal seams that are too thin or too slanted to be mined by conventional techniques. For such seams, UCG can effectively make use of the underground coal in an environmentally sound way by not disrupting the surface of the earth or the associated aquifers.

Figure 2:
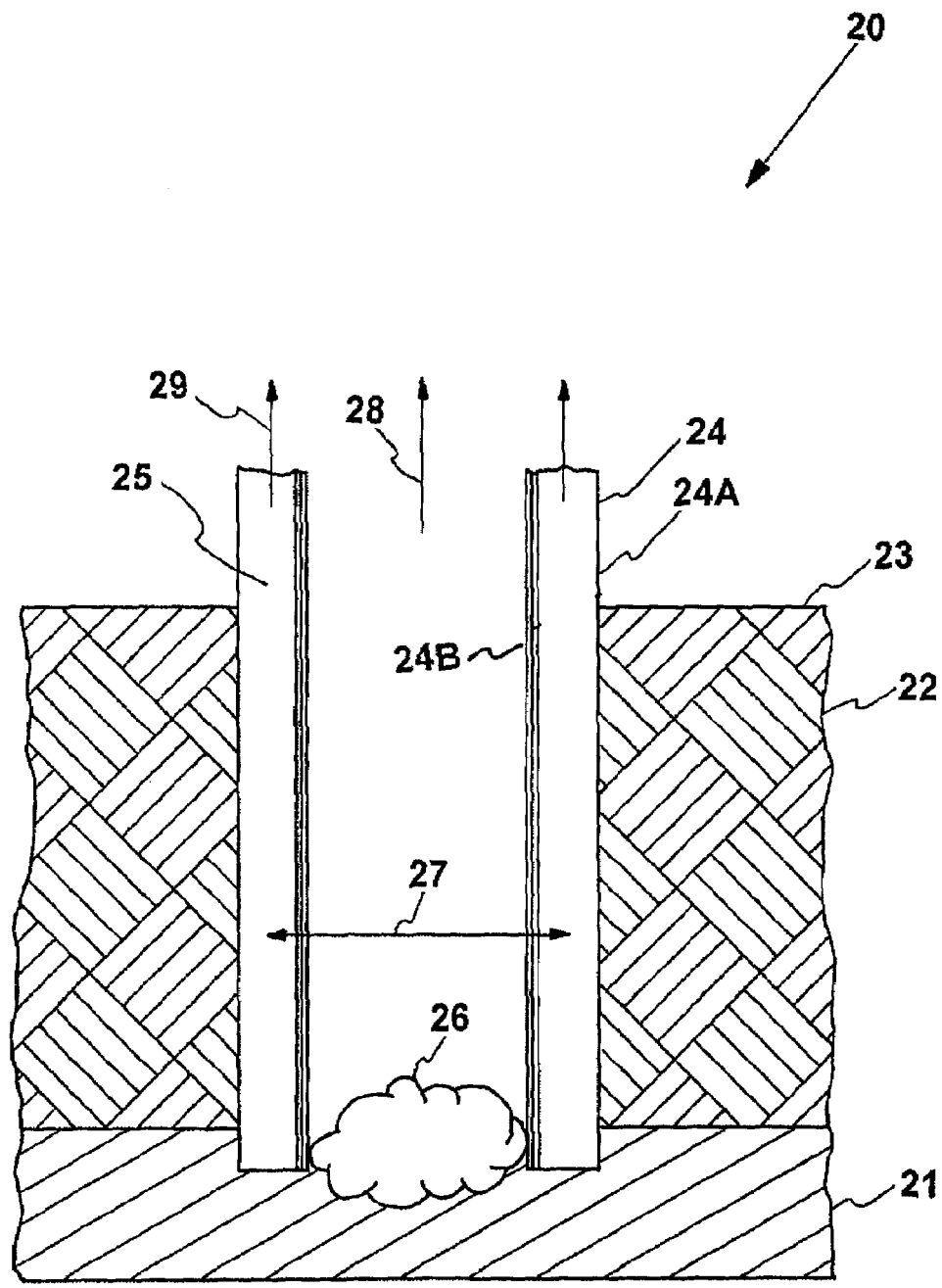
FIG. 2 illustrates one embodiment of a system of in-situ production of hydrogen in underground coal gasification constructed in accordance with the present invention.

Referring now to FIG. 2, one embodiment of a system of in-situ production of hydrogen in underground coal gasification constructed in accordance with the present invention is illustrated. The in-situ production of hydrogen in underground coal gasification system is designated generally by the reference numeral 20. The system 20 uses a Bi-functional Membrane 25 Reactor and Separator to produce $H_2$ from raw syngas 26.

Typical product gas from a coal gasification process comprises H2, CO, $CO_2$ and steam, whereas the really valuable product is hydrogen, $H_2$. In order to get more $H_2$ than that contained in the product gas (commonly known as Syngas), external equipment implementing the water gas shift reaction needs be deployed, adding extra expense due to added real estate and equipment. Systems for Underground Coal Gasification are described in United States Published Patent Application No. 2003/0024699 for "In-situ Production of Synthesis Gas from a Coal Formation." The disclosure of United States Published Patent Application No. 2003/0024699 is incorporated herein by this reference.

The present invention employs a bi-functional membrane 25 in a dual-walled production well 24, minimizing the cost of above-ground equipment. The catalyzed membrane 25 promotes the reaction by using different catalysts suitable for different temperature regimes, and induces the reaction toward completion by continuously removing the product hydrogen 27 and/or the product $CO_2$ from the reaction zone. This results in the water gas shift reaction going to completion, and also results in separation of $H_2$ and/or $CO_2$, the later being set aside for sequestration.

The system 20 provides a method and apparatus by which, by the use of a bi-functional membrane reactor, the WGS reaction can be made to proceed underground, with concurrent removal of pure $H_2$. This results in no additional above-ground equipment, and obtains a near-complete conversion of CO to $H_2$.

The United States has large quantities of coal that are currently uneconomical to mine. The system 20 provides a method and apparatus by which such coals can be used to produce $H_2$ without adverse environmental impacts or compromising safety. The $H_2$ produced by the system 20 also results in a nearly pure $CO_2$ stream, which can be sequestered to ameliorate global warming.

The commercial potential for this technology is large. The system 20 outlined here can result in large quantities of $H_2$, while simultaneously producing a concentrated stream of $CO_2$ (which contributes to global warming), which can be easily sequestered. Also, the use of this technology can result in utilization of coal seams that are currently uneconomical to mine.

The present invention as illustrated by the system 20 provides a method of obtaining hydrogen from a coal seam by providing a production well that extends into the coal seam; positioning a conduit in the production well leaving an annulus between the conduit and the coal gasification production well, the conduit having a wall; closing the annulus at the lower end to seal it from the coal gasification cavity and the syngas; providing at least a portion of the wall with a bifunctional membrane that serves the dual purpose of providing a catalyzing reaction and selectively allowing hydrogen to pass through the wall and into the annulus; and producing the hydrogen through the annulus. The present invention as illustrated by the system 20 also provides an apparatus for producing hydrogen from a coal gasification production well comprising a conduit adapted to be positioned in the coal gasification production well, an annulus that is closed at the bottom between the conduit and the coal gasification production well, at least a portion of the conduit being a bifunctional membrane that serves the dual purpose of providing a catalyzing reaction and selectively allowing hydrogen to pass into the annulus for production.

The system 20 is an improvement over the above-ground processing technology for many reasons:

(1) The additional expense of dual-walled reactor tubes is insignificant, since most of the expense in UCG is in drilling, and not in the production well tubes.

(2) The entire depth of production well can be used for the reaction and separation zone. This is typically of the order of 1000 ft of so. It is virtually impossible to create reactors and separators with this much residence time.

(3) As a result, the conversion of CO can be close to 100% (well above equilibrium), and the yield of H2 can be well above 90%.

(4) In addition, The $CO_2$ coming out of the production well is ready for sequestration after minor processing.

The system 20 illustrated in FIG. 2 provides in-situ production of hydrogen 27 in underground coal gasification using a bi-functional membrane reactor and separator. The system 20 can effectively make use of the underground coal 21 in an environmentally sound way by not disrupting the surface 23 of the earth or the associated aquifers. The coal 21 is located below the rock layer 22. FIG. 2 is a schematic illustrating the way the system 20 works.

The system 20 uses a double-walled production well 24. The outer annulus 24A is sealed from the coal bed 21. The inner wall of the production well is made of a bifunctional membrane 25 that serves the dual purpose of catalyzing reaction, Equation 4, and selectively allowing hydrogen $H_2$ to pass through it. The hydrogen $H_2$ is designated by the reference numeral 27. The membrane 25 may be made of a number of materials, including hydrophobic silica. A number of shift catalysts (typically $CuO/ZnO/Al_2O_3$) are commercially available.

Raw syngas 26 flows upward through the production well 24. The bifunctional membrane, inner wall 24B, serves the dual purpose of catalyzing reaction, Equation 4, and selectively allowing hydrogen $H_2$ 27 to pass through it. This leaves $CO_2$-rich syngas 28 in the inner wall 24B of the production well 24. A vacuum is applied to the annulus 25 between the outer wall 24A and the inner wall 24B of the production well to continuously remove the $H_2$ 27 produced, and also to provide a larger pressure gradient for the transportation of the $H_2$ 27 through the membrane 25. The system 20 provides in-situ production of hydrogen 27 in underground coal gasification using a bi-functional membrane 25 reactor and separator.

There are a number of advantages of the system 20 over the older ones that use above ground shift reactors: (1) No extra equipment is needed. (2) The incremental cost of the double-walled production well is small compared to the original cost of drilling and installing the production well. (3) The materials used in the construction of the inner wall are inexpensive and readily available. (4) The lengths of the wells are typically of the order of thousands of feet. This provides for exceptionally large residence times for $H_2$ separation as well as for the water gas shift reaction. This virtually guarantees that near complete yield of H will be obtained. (5) If pure oxygen is used, the syngas flowing out of the inner tube will be made up mostly of $CO_2$ and steam. (6) A simple condenser can remove the steam, thus producing a nearly pure $CO_2$ stream ready for sequestration.

Figure 3:
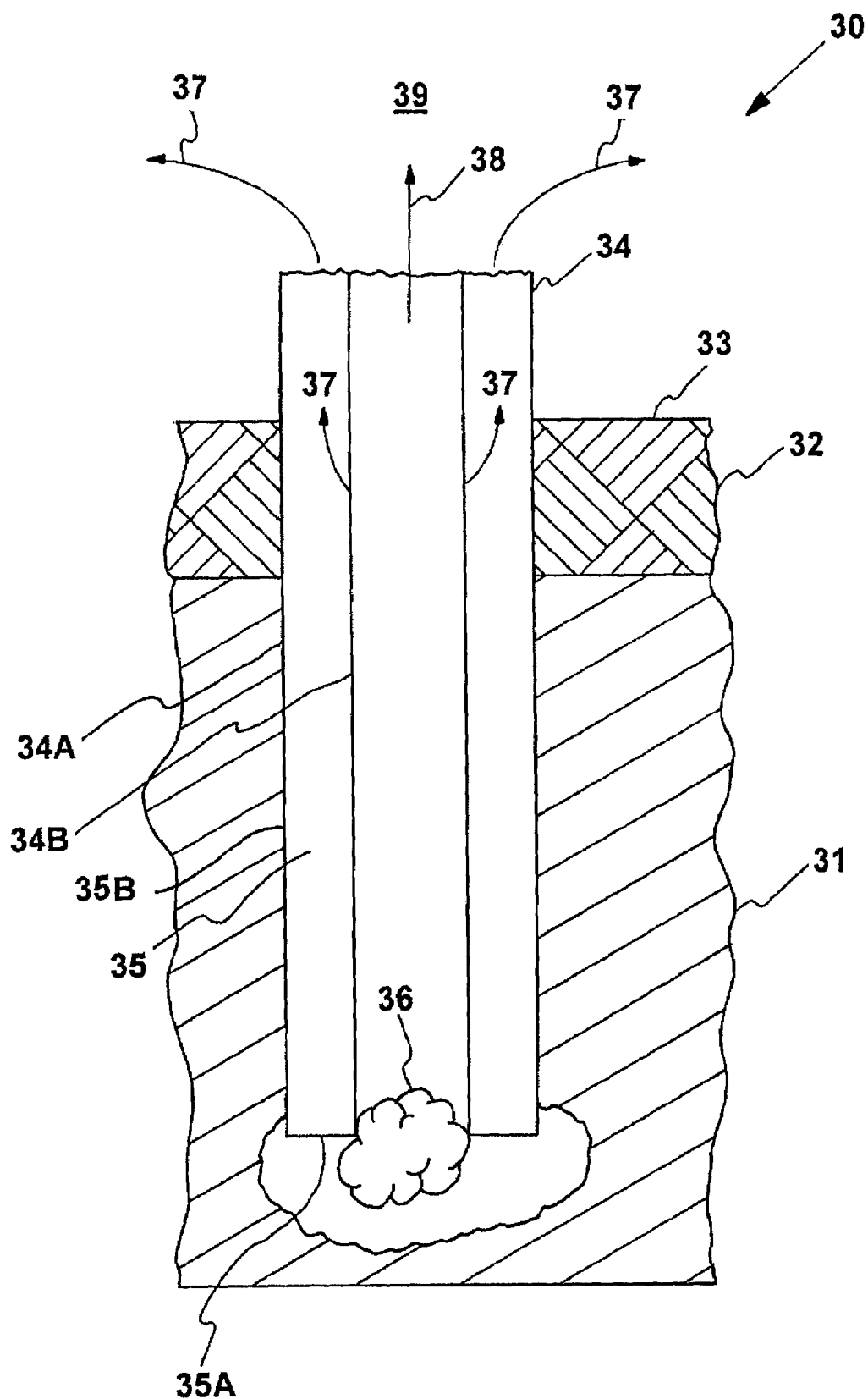
FIG. 3 illustrates another embodiment of a system of in-situ production of hydrogen in underground coal gasification constructed in accordance with the present invention.

Referring now to FIG. 3, another embodiment of a system of in-situ production of hydrogen in underground coal gasification constructed in accordance with the present invention is illustrated. The in-situ production of hydrogen in underground coal gasification system is designated generally by the reference numeral 30.

The present invention employs a bi-functional membrane 35 in a dual-walled production well 34, minimizing the cost of above-ground equipment. The catalyzed membrane 35 promotes the reaction by using different catalysts suitable for different temperature regimes, and induces the reaction toward completion by continuously removing the product hydrogen 37 and/or the product $CO_2$ 38 from the reaction zone. This results in the water gas shift reaction going to completion, and also results in separation of $H_2$ and/or $CO_2$, the later being set aside for sequestration.

The system 30 illustrated in FIG. 3 provides an in-situ production of hydrogen 37 in underground coal gasification using a bi-functional membrane reactor and separator. The system 30 can effectively make use of the underground coal 31 in an environmentally sound way by not disrupting the surface 33 of the earth or the associated aquifers. The coal 31 is located below the rock layer 32.

The system 30 uses a double-walled production well 34. The outer wall 34A is sealed from the coal bed 31. The annulus 35b between outer wall 34A and inner wall 34B is sealed at the lower end by closure 35A.

The inner wall 34B of the production well is made of a bifunctional membrane 34B that serves the dual purpose of catalyzing reaction, Equation 4, and selectively allowing hydrogen $H_2$ to pass through it. The hydrogen $H_2$ is designated by the reference numeral 37. The membrane 34B may be made of a number of materials, including hydrophobic silica. A number of shift catalysts (typically $CuO/ZnO/Al2O_3$) are commercially available.

Raw syngas 36 builds-up in the production well 34. The bifunctional membrane, inner wall 34B, serves the dual purpose of catalyzing reaction, Equation 4, and selectively allowing hydrogen $H_2$ 37 to pass through it. This leaves CO2-rich syngas 38 in the inner wall 34B of the production well 34. A vacuum 39 applied to the annulus 35 between the outer wall 34A and the inner wall 34B of the production well. The system 30 provides in-situ production of hydrogen 37 in underground coal gasification using a bi-functional membrane 34B reactor and separator.

There are a number of advantages of the system 30 over the older ones that use above ground shift reactors: (1) No extra equipment is needed. (2) The incremental cost of the double-walled production well is small compared to the original cost of drilling and installing the production well. (3) The materials used in the construction of the inner wall are inexpensive and readily available. (4) The lengths of the wells are typically of the order of thousands of feet. This provides for exceptionally large residence times for $H_2$ separation as well as for the water gas shift reaction. This virtually guarantees that near complete yield of $H_2$ will be obtained. (5) If pure oxygen is used, the syngas flowing out of the inner tube will be made up mostly of $CO_2$ and steam. (6) A simple condenser can remove the steam, thus producing a nearly pure $CO_2$ stream ready for sequestration.

Figure 4:
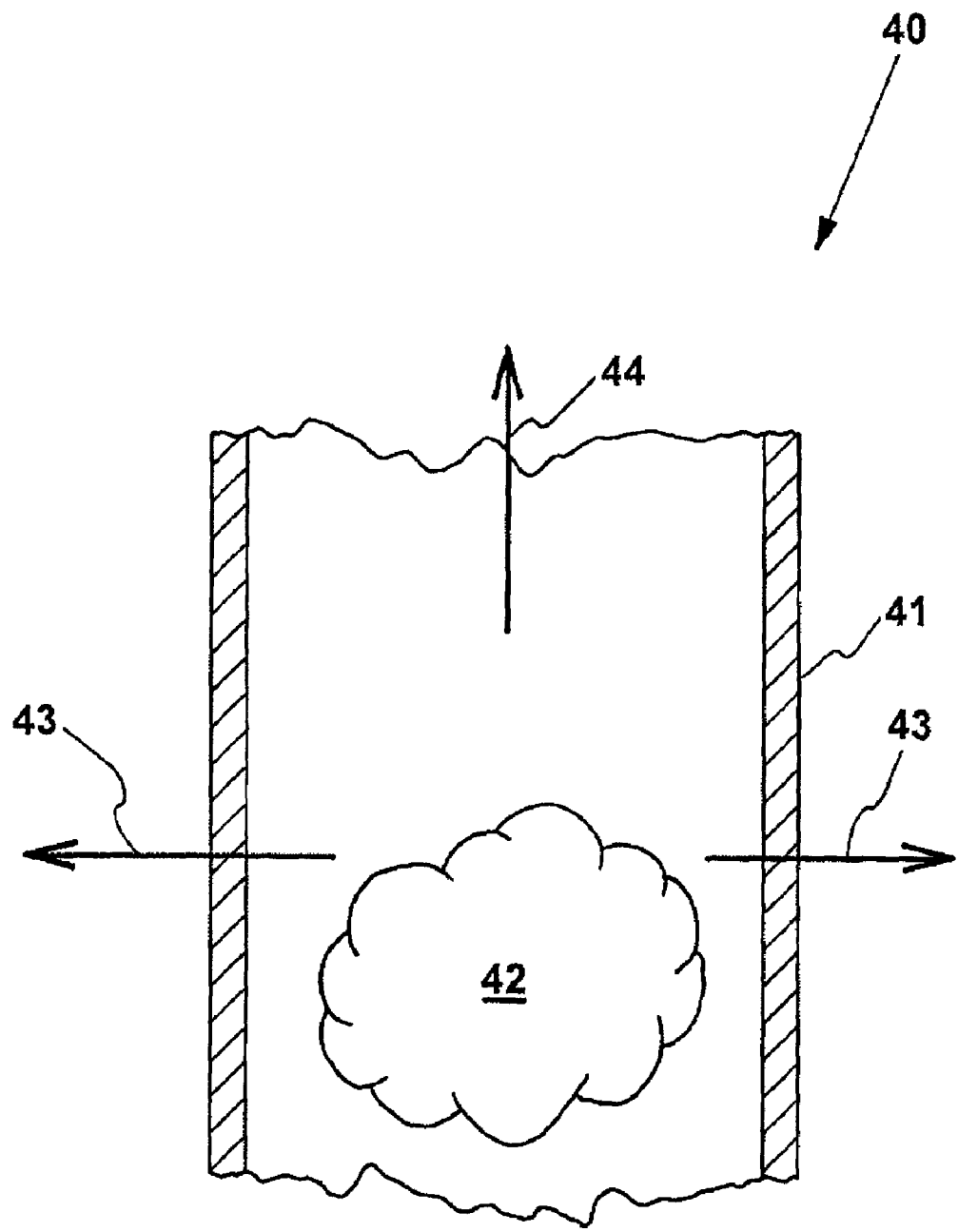
FIG. 4 shows an inner wall of the production well made of a bifunctional membrane that serves the dual purpose of a catalyzing reaction and selectively allowing $H_2$ to pass through it.

Referring now to FIG. 4, an inner wall of a production well made of a bifunctional membrane that serves the dual purpose of a catalyzing reaction and selectively allowing $H_2$ to pass through it is illustrated. The overall in-situ production of hydrogen in an underground coal gasification system is referred to generally and illustrated by the reference numeral 40. The bi-functional membrane is designated by the reference numeral 41.

The catalyzed membrane 41 promotes the reaction by using different catalysts suitable for different temperature regimes, and induces the reaction toward completion by continuously removing the product hydrogen 42 and/or the product $CO_2$ 44 from the reaction zone. This results in the water gas shift reaction going to completion, and also results in separation of $H_2$ and/or $CO_2$, the later being set aside for sequestration.

The catalyzed membrane 41 can be a number of known membranes. One suitable membrane 41 is a hydrophobic silica membrane. Another suitable membrane is a palladium coating on a high permeability alloy tube. The manufacture and principals are known in the prior art. Palladium silver membranes are an established standard. Fabrication technology for palladium silver is very well developed so that units of 30,000 $cm^2$ are available. Palladium-coated composite membranes are less developed. Ceramic membranes (coated and uncoated) show much higher flux than non-porous membranes when operated at their ideal temperatures and without fouling ingredients.

The system 40 provides an in-situ production of hydrogen 43 in underground coal gasification using the bi-functional membrane 41. Raw syngas 42 builds-up in the bifunctional membrane 41. The bifunctional membrane 41 serves the dual purpose of catalyzing reaction, Equation 4, and selectively allowing hydrogen $H_2$ 43 to pass through it. This leaves CO2-rich syngas 42 in the inner wall of the membrane 41.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for producing hydrogen from an underground coal gasification production well, comprising:
   a conduit adapted to be positioned in the underground coal gasification production well,
   an annulus between said conduit and the underground coal gasification production well,
   at least a portion of said conduit being a bifunctional membrane that serves the dual purpose of providing a catalyzing reaction and selectively allowing hydrogen to pass into said annulus for production.

2. The apparatus for obtaining hydrogen from an underground coal gasification production well of claim 1 including a source of vacuum connected to said annulus.

3. The apparatus for obtaining hydrogen from an underground coal gasification production well of claim 1 wherein said conduit forms the inside wall of a double-walled production well.

4. The apparatus for obtaining hydrogen from an underground coal gasification production well of claim 1 wherein said membrane is a hydrophobic silica membrane.

5. The apparatus for obtaining hydrogen from an underground coal gasification production well of claim 1 wherein said membrane is a porous ceramic membrane.

6. The apparatus for obtaining hydrogen from an underground coal gasification production well of claim 1 wherein said membrane is a palladium-coated membrane.

7. The apparatus for obtaining hydrogen from an underground coal gasification production well of claim 1 wherein said membrane is a palladium coating on a high permeability alloy tube membrane.

8. The apparatus for obtaining hydrogen from an underground coal gasification production well of claim 1 wherein said bifunctional membrane serves as a catalyst for a water-gas shift reaction.

9. An apparatus for the underground coal gasification production of hydrogen, comprising:
   a double-walled production well having
   an outer conduit,
   an inner conduit with a wall, wherein at least a portion of said wall is made of a bifunctional membrane that serves the dual purpose of providing a catalyzing reaction and selectively allowing hydrogen to pass through said wall, and
   an annulus between said inner conduit and said outer conduit.

10. The apparatus for the underground coal gasification production of hydrogen of claim 9 including a source of vacuum connected to said annulus for producing the hydrogen through said annulus.

11. The apparatus for the underground coal gasification production of hydrogen of claim 9 wherein said membrane is a hydrophobic silica membrane.

12. The apparatus for the underground coal gasification production of hydrogen of claim 9 wherein said membrane is a porous ceramic membrane.

13. The apparatus for the underground coal gasification production of hydrogen of claim 9 wherein said membrane is a palladium-coated membrane.

14. The apparatus for the underground coal gasification production of hydrogen of claim 9 wherein said membrane is a palladium coating on a high permeability alloy tube membrane.

15. The apparatus for the underground coal gasification production of hydrogen of claim 9 wherein said bifunctional membrane serves as a catalyst for a water-gas shift reaction.

16. A method of obtaining hydrogen from a coal seam in an underground coal gasification system, comprising the steps of:
   providing a production well that extends into the coal seam;
   positioning a conduit in said production well leaving an annulus between said conduit and said coal gasification production well, said conduit having a wall;
   providing at least a portion of said wall with a bifunctional membrane that serves the dual purpose of providing a catalyzing reaction and selectively allowing hydrogen to pass through said wall and into said annulus; and
   producing said hydrogen through said annulus.

17. A method of obtaining hydrogen from a coal seam in an underground coal gasification system of claim 16 including the step of providing a vacuum connected to said annulus for producing the hydrogen through said annulus.

* * * * *